May 21, 1946.  H. ST. PIERRE  2,400,854
CHAIN LINK
Filed Feb. 3, 1943
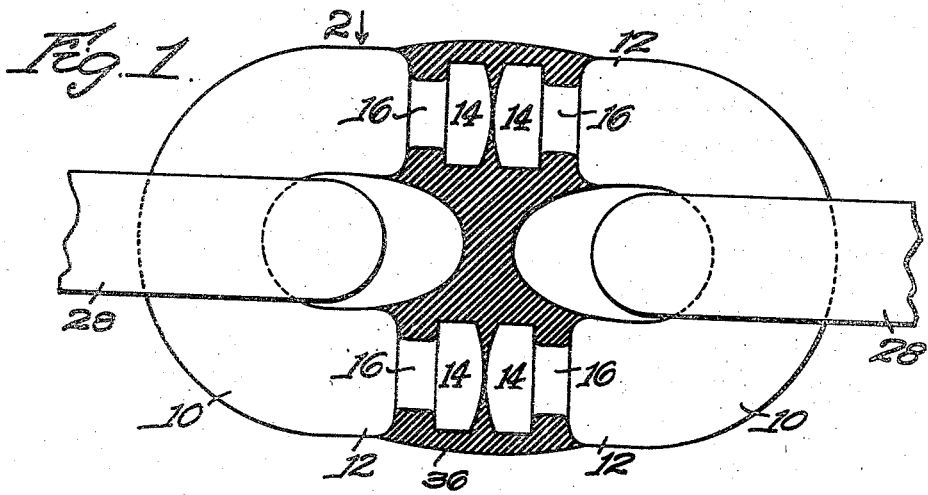
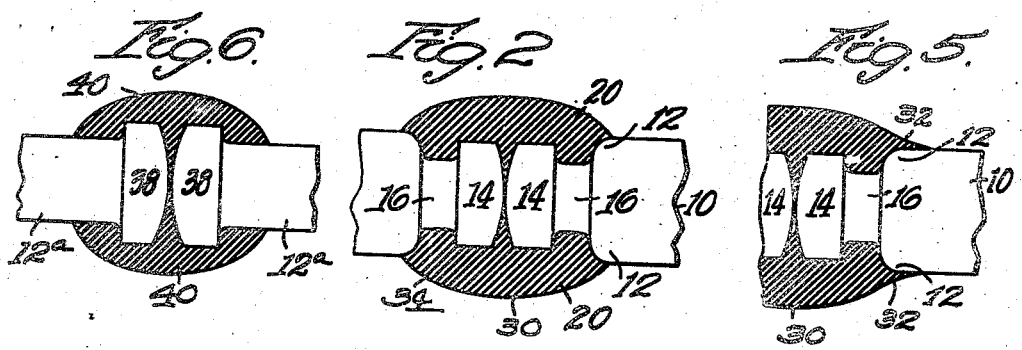
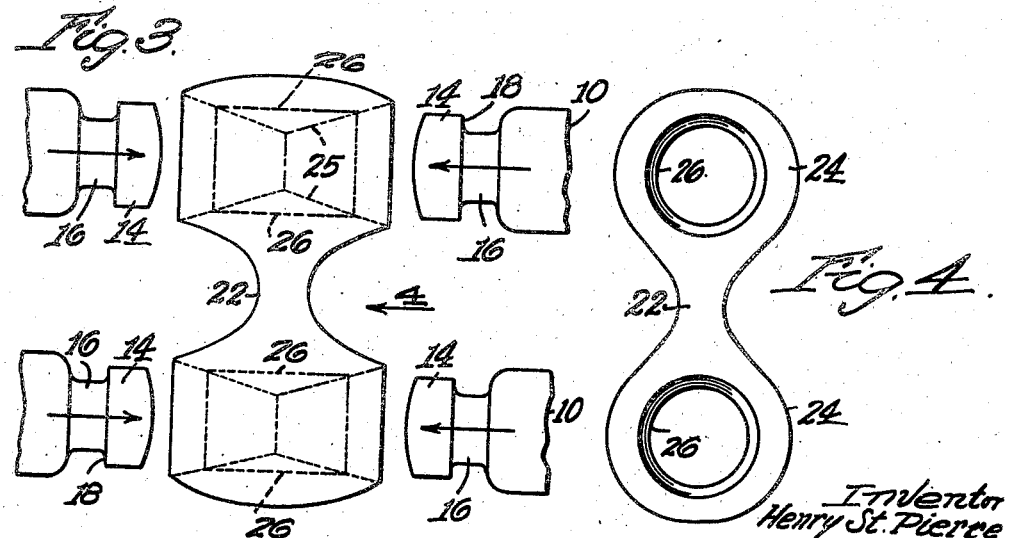
Inventor
Henry St. Pierre
by attorney
Charles R. Fay Patented May 21, 1946

2,400,854

UNITED STATES PATENT OFFICE 2,400,854

CHAIN LINK

Henry St. Pierre, Worcester, Mass.

Application February 3, 1943, Serial No. 474,569

1 Claim. (Cl. 59—84)

This invention relates to new and improved chain locking links.

Objects of the invention include the provision of locking links of both stud and plain type and comprises two similar, forged link end pieces which are formed in the shape of a C or U, each piece having a pair of generally similar ends which are provided with shouldered locking heads, there being a connecting piece or pieces for securing the two end pieces together, said connecting piece or pieces being provided originally with means forming apertures or holes for receiving the shouldered heads on the end pieces, and said connecting piece or pieces being originally forged with more metal than is necessary merely to connect the end pieces for the purpose of providing a strengthening bulged section in the connecting piece or pieces at the point requiring additional strength in the connecting piece.

Difficulty has always been present in making strong forged locking links for chains because the female members in the locking links have been found to have cross sections which are too thin and weak, or in cases where the female member is made sufficiently large, the male member has been found to be too weak for chains which are used in applications requiring great strength. The present invention provides a locking link and method of making the same in a simple but extremely effective manner to provide a chain link of the locking type which will not break at the locking connection.

Other objects and advantages of the invention will appear hereinafter.

Reference is to be had to the accompanying drawing in which

Fig. 1 is a plan view of a link made according to the invention and showing the connection part in section;

Fig. 2 is an edge view of the link of Fig. 1 and looking in the direction of arrow 2 in Fig. 1, the connecting piece being in section;

Fig. 3 is a view showing the manner of assembly of the locking link;

Fig. 4 is an edge view of the connecting piece looking in the direction of arrow 4 in Fig. 3;

Fig. 5 is a view partly in section showing a modified form of connecting piece; and Fig. 6 is a section through another form of connecting piece.

The present invention may be applied to plain or stud links but it has been elected to disclose the invention as applied to a stud link. It is to be understood that the invention is applied to locking links which are used to connect solid links for the assembly of chain and for that reason the locking link must embody means providing for the assembly of a solid link at each end of the locking link prior to the finishing connection of the locking link parts.

In Fig. 1 there is shown a pair of end pieces for the link, these end pieces being indicated generally at 10. End pieces 10 are exactly alike and may be forged in the same or similar dies. Each end piece 10 is forged in a die in a C or U shape, and having free ends as at 12. Each of the end pieces has two ends 12 and each end 12 is provided with a head 14 forged simultaneously and in the same die with the body of the end piece. It will be seen that each head 14 is relatively large and heavy and is connected to the body of the pieces 10 by means of a reduced locking neck 16, the necks 16 being of relatively large cross section as compared to the usual male connection member of a locking link, but the shoulders 18 which are formed between the heads 14 and necks 16 are sufficient to provide an abutment for locking the ends together by means of the connecting piece 20 to be described.

The connecting piece 20 is a unitary forged piece in the case of a stud link, and in the form shown comprises a dumbbell-like element having a waist 22 and a pair of enlarged ends 24, said ends being alike and originally forged along lines 25 to form a necked tapered aperture as indicated in Fig. 3.

When the connecting piece 20 has been originally forged as above described, it may be punched out along line 26 in Fig. 3 to remove material from the interior of the end pieces 24 and also to remove any fin which may have been left in the forging action so that when the connecting piece 20 is ready for assembly, it is provided with an interior passage along lines 26 of a size to receive the heads 14 as indicated in Fig. 3. Obviously, the two links 28 are applied to end pieces 10 just prior to the assembly of the end pieces with the connecting piece 20.

End pieces 10 having been set into the passages 26 in the connecting piece, the latter is heated and is then forged in a die to force the metal of the connecting piece ends 24 to flow closely behind shoulders 18 of heads 14 to completely fill and surround necks 16 in the manner shown in Fig. 1. The ends of the connecting pieces 20 are originally provided with what may be termed a surplus of material so that the final section of the end piece 24 at neck 16 and heads 14 is relatively large and is clearly sufficient to impart enough strength at these points to prevent breakage and to hold the ends 10 together until the end pieces 10 themselves are broken under severe testing. Referring to Figs. 1 and 2 it will be seen that the so called surplus metal of the ends 24 provides a bulge along a line 30 all around heads 14 and neck 16, and by reason of the bulge the metal section at the necks is similar to the section at the heads. In other words the bulge along lines 30 is of a form to provide a heavy section where it is needed in the connection member at the heads 14 as well as at neck 16, and the increase in metal section due to the enlargement of heads 14 relative to necks 16, is compensated for by the fact that the bulge 30 is bulged outwardly at its greatest extent in the region of the heads and less so at the reduced necks.

The bulge which is occasioned by the present construction is unobjectionable in most cases and does not interfere with the operation of the chain and does not impair the usefulness or appearance thereof; and at the same time the bulge provides for strengthening of the female connecting member at the exact point where such strengthening is the most desirable. In other words the section of the female member is substantially uniform regardless of the presence of the reduced locking necks 16.

In the form shown in Figs. 1 and 2, the bulge line 30 terminates approximately at the point of wider section of end pieces 10, but it is also provided as shown in Fig. 5 with a means of streamlining the bulge by forging some of the extra material of the connecting pieces along over the ends 12 of the end pieces 10 as is clearly shown at 32 in Fig. 5.

As is well known in the art, the points of connection of locking links carry only one-half the load of the link because this load is split between the two connections. The optimum conditions of locking links is to provide a construction wherein the link will break under test at a point in the end pieces 10 rather than in the connection between the end pieces. This condition is extremely hard to obtain due to the fact that the ordinary locking link must sacrifice metal section either in the male or female connecting piece, and this weakens the connection even though only one-half the load is on each connection, and a good example of this difficulty is illustrated in the prior art in the patent to Lutts et al., 1,974,827, wherein the female member as at 14 in Fig. 10 has been sacrificed to provide a relatively strong male connecting piece section as at 26 in Fig. 3 of this patent. The present invention provides for equal strength in both connecting members and it also provides a construction wherein the strength of the connection is seen to be uniform in spite of variation in the section of metal between heads 14 and necks 16.

In order to obtain the optimum conditions above described, the present invention provides for an irregular non-circular or ovoid form in the female parts 24 of the stud or connecting members. This conformation is seen by comparing Figs. 1 and 2, wherein the curved or bulged section is greater at the lateral aspects of the link as at 34 than at the edge aspect as at 36. Thus both sides of the parts 24 are heavy and thick and the single edge at 36, although strong, is thinner and extends along a flatter curve. It is contemplated that edge 36 may even be substantially straight, or curved slightly to merge with ends 12 uniformly in cases when the entire link is oval.

By this construction the link presents no obstructions to sheaves or the like in cases where the chain passes through openings, since the strengthening bulges as at 34 lie almost entirely at the sides of the chain locking links, rather than at the edges, the latter extending the furthest outward of any part of the chain from the axis thereof.

Fig. 6 shows a modification wherein connecting heads 38 are merely enlargements of the chain link ends 12a, and in this case the bulge 40 extends substantially outwardly laterally but not so much at the chain edge, it being noted that Fig. 6 is a view taken in the same relation to the link as Fig. 2.

Having thus described my invention and the advantages thereof, I do not wish to be limited to the details herein disclosed, otherwise than as set forth in the claim, but what I claim is:

A locking link comprising three parts, two of said parts being similar C-shaped end pieces and each piece having a pair of ends, a reduced neck at each end and a head forming a shoulder therewith on each neck; and the third part comprising a stud, means forming passages in the stud, corresponding heads and necks of the C-shaped end pieces being located in pairs in separate apertures, said stud in the region of the passages bulging outwardly on curved lines at the edges but principally at the lateral aspects of the link to provide increased metal sections in the stud adjacent the heads and necks, the bulges of the stud being along curved lines which extend outwardly of the link to a greater extent at the heads than at the necks to provide an approximately uniform area of section at the heads and necks.

HENRY ST. PIERRE.